United States Patent [19]
Kern et al.

[11] Patent Number: 5,376,877
[45] Date of Patent: Dec. 27, 1994

[54] ENGINE-DRIVEN GENERATOR

[75] Inventors: Robert Kern, Waukesha; Gerald Ruehlow, Oconomowoc, both of Wis.; Graham McLean, Lymm, England; Michael Wheeley, Reading, United Kingdom; Frank Wedel, Lake Mills; Mark Kastner, Greenfield, both of Wis.

[73] Assignee: Generac Corporation, Waukesha, Wis.

[21] Appl. No.: 897,380

[22] Filed: Jun. 11, 1992

[51] Int. Cl.[5] .......................... H02J 7/14; H02P 9/14
[52] U.S. Cl. ...................................... 322/32; 363/160
[58] Field of Search ........................ 322/32; 363/160

[56] References Cited

U.S. PATENT DOCUMENTS

| | | |
|---|---|---|
| Re. 26,641 | 8/1969 | Corey . |
| 3,178,630 | 4/1965 | Jessee . |
| 3,246,228 | 4/1966 | Wickenhagen . |
| 3,350,621 | 10/1967 | Caldwell . |
| 3,419,783 | 12/1968 | Bingley . |
| 3,539,900 | 11/1970 | Chausse et al. . |
| 3,577,851 | 5/1971 | Detheridge . |
| 3,663,945 | 5/1972 | Hughes et al. . |
| 3,809,034 | 5/1974 | Durichen . |
| 3,916,284 | 10/1975 | Hilgendorf . |
| 4,079,307 | 3/1978 | Hazumi et al. . |
| 4,102,040 | 7/1978 | Rich . |
| 4,115,729 | 9/1978 | Young et al. . |
| 4,117,389 | 9/1978 | Hazumi et al. . |
| 4,119,861 | 10/1978 | Gocho . |
| 4,188,926 | 2/1980 | Fleischer . |
| 4,280,072 | 7/1981 | Gotou et al. . |
| 4,303,843 | 12/1981 | Arnoux et al. . |
| 4,364,169 | 12/1982 | Kawano et al. . |
| 4,365,180 | 12/1982 | Licata et al. . |
| 4,392,073 | 7/1983 | Rosenberry, Jr. . |
| 4,549,104 | 10/1985 | Niimura et al. ............ 310/67 R |
| 4,626,727 | 12/1986 | Janson ....................... 310/156 |
| 4,636,761 | 1/1987 | Terada ........................ 310/74 |
| 4,661,761 | 4/1987 | Katsumata . |
| 4,719,378 | 1/1988 | Katsuma et al. ............ 310/67 B |
| 4,728,842 | 3/1988 | Martin . |
| 4,739,203 | 4/1988 | Miyao et al. ................ 310/67 R |
| 4,761,576 | 8/1988 | Savage . |
| 4,835,839 | 6/1989 | Forbes et al. . |
| 4,838,226 | 1/1989 | Matsuzawa et al. .......... 123/399 |
| 4,901,428 | 2/1990 | King . |
| 4,918,343 | 4/1990 | Heinrich et al. ............. 310/58 |
| 4,932,375 | 6/1990 | Burney ....................... 123/361 |
| 5,003,948 | 4/1991 | Churchill et al. ............ 123/352 |
| 5,033,433 | 7/1991 | Churchill et al. ............ 123/361 |
| 5,081,388 | 1/1992 | Chen . |
| 5,142,178 | 8/1992 | Kloster et al. . |

*Primary Examiner*—R. J. Hickey
*Attorney, Agent, or Firm*—Reinhart, Boerner, Van Deuren, Norris & Rieselbach

[57] ABSTRACT

An engine-driven generator includes an internal combustion engine, a permanent magnet alternator and an AC to AC converter. The output frequency and voltage of the permanent magnet alternator are largely dependent on engine speed and the alternator load. The AC to AC converter converts the speed-dependent alternating current developed by the alternator to another alternating current whose frequency and voltage are largely independent of engine speed. Voltage regulation is provided by varying the engine speed in accordance with the load current. Frequency regulation is provided by frequency dividing the alternator output by an integer divisor that varies in accordance with engine speed. Additional voltage regulation is provided by deleting selected cycles of the alternator output current as needed to maintain the RMS output voltage within predetermined limits.

14 Claims, 7 Drawing Sheets

ENGINE-DRIVEN GENERATOR

BACKGROUND OF THE INVENTION

This invention relates generally to power generating equipment and, more particularly, to engine-driven generators.

Known portable power generators typically include an internal combustion engine turning an alternator designed to provide a 120 or 240 volt, 50 or 60 hertz alternating current output. One characteristic of such prior power generators is that, in use, the engine speed is held substantially constant regardless of the actual load. This is necessary because, in such generators, the output frequency is a direct function of engine speed. Running the engine at a constant (usually high) speed results in excessive noise, vibration and fuel consumption, particularly where the load is relatively light and maximum engine power is not required. Alternatively, if multiple pole alternators are used to permit the use of lower synchronous engine speeds, considerable unused engine capacity is frequently available. This is wasteful and makes the generator larger, heavier and more expensive than it needs to be.

Another characteristic of prior power generators (particularly those using permanent magnet alternators) is that the alternators they include are not run at their maximum power output levels. At a given engine speed, such alternators typically provide maximum power when the alternator output voltage drops to about 70% of the no load voltage. Such a voltage drop, however, is unacceptable in practice, and the usual practice is to run alternators at far less than their maximum power output levels. Thus, to achieve a useful output power of, say, 3.5 KW with a voltage drop of only 5%, the usual practice is to use a permanent magnet alternator capable of developing far more than 3.5 KW. Such an alternator thus has considerable excess capacity that is never utilized, and is physically larger, heavier and more expensive than an alternator having a maximum power capability of 3.5 KW. The challenge, therefore, is to operate an alternator at up to its peak power capabilities while still keeping the output frequency and voltage within acceptable limits.

To improve efficiency and reduce size and weight, some prior generators have combined high frequency multiphase alternators with electrical circuitry for converting the high frequency multiphase alternating current to a 50 Hz or 60 Hz single-phase current independent of engine speed. Such a system is shown, for example, in U.S. Pat. No. 3,916,284 which issued Oct. 28, 1975 to Walter P. Hilgendorf. In the Hilgendorf system, voltage regulation is provided by varying the current through the pole field winding of an alternator having a polyphase armature winding and a self-excited field winding. Accordingly, the Hilgendorf system is not readily adapted for use in permanent magnet alternators having a fixed stator and a permanent magnet rotor arranged to rotate around the stator. Because permanent magnet alternators provide many advantages over self-excited alternators, this shortcoming of the Hilgendorf system is significant.

In view of the foregoing, it is a general object of the present invention to provide a new and improved engine-driven portable generator.

It is a further object of the present invention to provide a new and improved engine-driven portable generator that is economical, lightweight, efficient and quiet.

It is a further object of the present invention to provide a new and improved engine-driven portable generator that permits a permanent magnet alternator to be operated up to its maximum power output, while still providing acceptable and useful frequency and voltage regulation.

SUMMARY OF THE INVENTION

The invention provides an engine-driven generator comprising an internal combustion engine and an alternator coupled to the engine for developing a first alternating potential having a frequency and no-load voltage dependent on the speed of the engine. Circuitry is provided for converting the first alternating potential into a second alternating potential of lower frequency, the second alternating potential comprising a predetermined number of positive-polarity half-cycles of the first alternating potential followed by an equal number of negative polarity half-cycles of the first alternating potential. Logic is provided for increasing or decreasing the predetermined number in accordance with the frequency of the first alternating potential so as to maintain the frequency of the second alternating potential between pre-established upper and lower frequency limits. Still additional logic is provided for deleting, from the second alternating potential, selected ones of the positive and negative-polarity half-cycles of the first alternating potential so as to maintain the RMS voltage of the second alternating potential between pre-established upper and lower voltage limits.

The invention also provides a method of operating an engine-driven generator so as to generate an alternating potential having a frequency and voltage that remain within predetermined limits despite varying loads. The method comprises the step of turning an alternator with an engine to develop a first alternating potential having a frequency and no-load voltage related directly to the engine speed. The method further comprises the step of converting the first alternating potential into a second alternating potential of lower frequency wherein each positive-polarity half-cycle of the second alternating potential comprises a predetermined number of positive-polarity half-cycles of the first alternating potential, and wherein each negative-polarity half-cycle of the second alternating potential comprises an equal number of negative-polarity half-cycles of the first alternating potential. The method further comprises the step of increasing the predetermined number with increasing frequency of the first alternating potential so that the frequency of the second alternating potential remains within predetermined upper and lower frequency limits. The method further comprises the step of eliminating from the positive and negative-polarity half-cycles of the second alternating potential, selected ones of the positive and negative-polarity half-cycles of the first alternating potential so that the RMS voltage of the second alternating potential remains substantially between predetermined upper and lower voltage limits.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 7 is a graph showing output voltage, engine speed and output frequency versus load current for one embodiment of the engine-driven generator, useful in understanding the operation thereof.

DESCRIPTION OF THE PREFERRED EMBODIMENT

Figure 1:
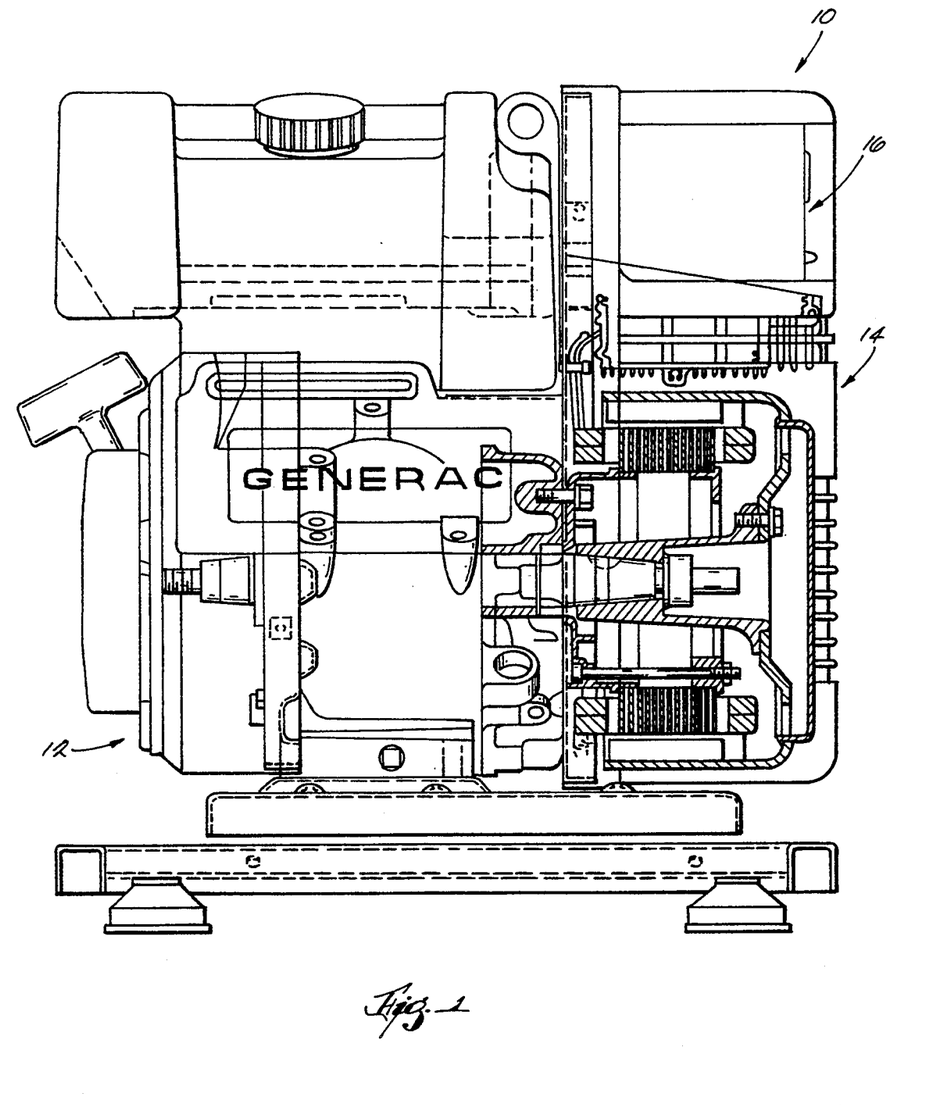
FIG. 1 is side elevation view of an engine-driven generator constructed in accordance with various aspects of the invention.

Referring to the drawings, a portable power generator 10 embodying various features of the invention is shown in FIG. 1. The power generator 10 generally includes an internal combustion engine 12 coupled to a permanent magnet alternator 14. The engine 12 and alternator 14 are preferably those shown and described in the copending applications of Kern, et al. entitled, respectively, "Internal Combustion Engine for Portable Power Generating Equipment" and "Permanent Magnet Alternator," the specifications of which are incorporated by reference herein.

In operation, the engine 12 turns the permanent magnet alternator 14 to develop a first alternating current or potential (also referred to herein as the "alternator current" and "alternator output"). The frequency, as well as the no-load voltage of the first alternating current is directly related to the engine speed, i.e., the frequency and no-load voltage both increase as engine speed increases. The power generator 10, in accordance with one aspect of the invention, further includes a control and regulator circuit 16 that converts the first alternating current developed by the alternator into a second, lower frequency, alternating current or potential (e.g, 60 Hz 120 VAC) useful for powering various electrical devices. (The second alternating current is also referred to herein as the "Generator Current" or "Generator Output").

In accordance with one aspect of the invention, and in contrast to prior devices, the internal combustion engine 12 in the power generator 10 does not operate at a fixed, constant speed, but, rather, operates at a speed that varies in accordance with the load current. In other words, at low loads, where relatively little current is required from the power generator 10, the engine speed is relatively low. At higher loads, where greater current is drawn from the generator 10, the engine speed is higher. In all cases, the frequency and voltage of the alternating current produced by the generator 10 remain relatively constant and substantially within pre-established upper and lower limits (e.g., 56–60 Hz, and 108–127 $V_{rms}$). This remains true even though the frequency and voltage of the alternator output changes greatly with changing engine speed. Such voltage and frequency regulation is accomplished by the control and regulator circuit 16 which controls engine speed and converts the alternator current into the generator output current.

Figure 2:
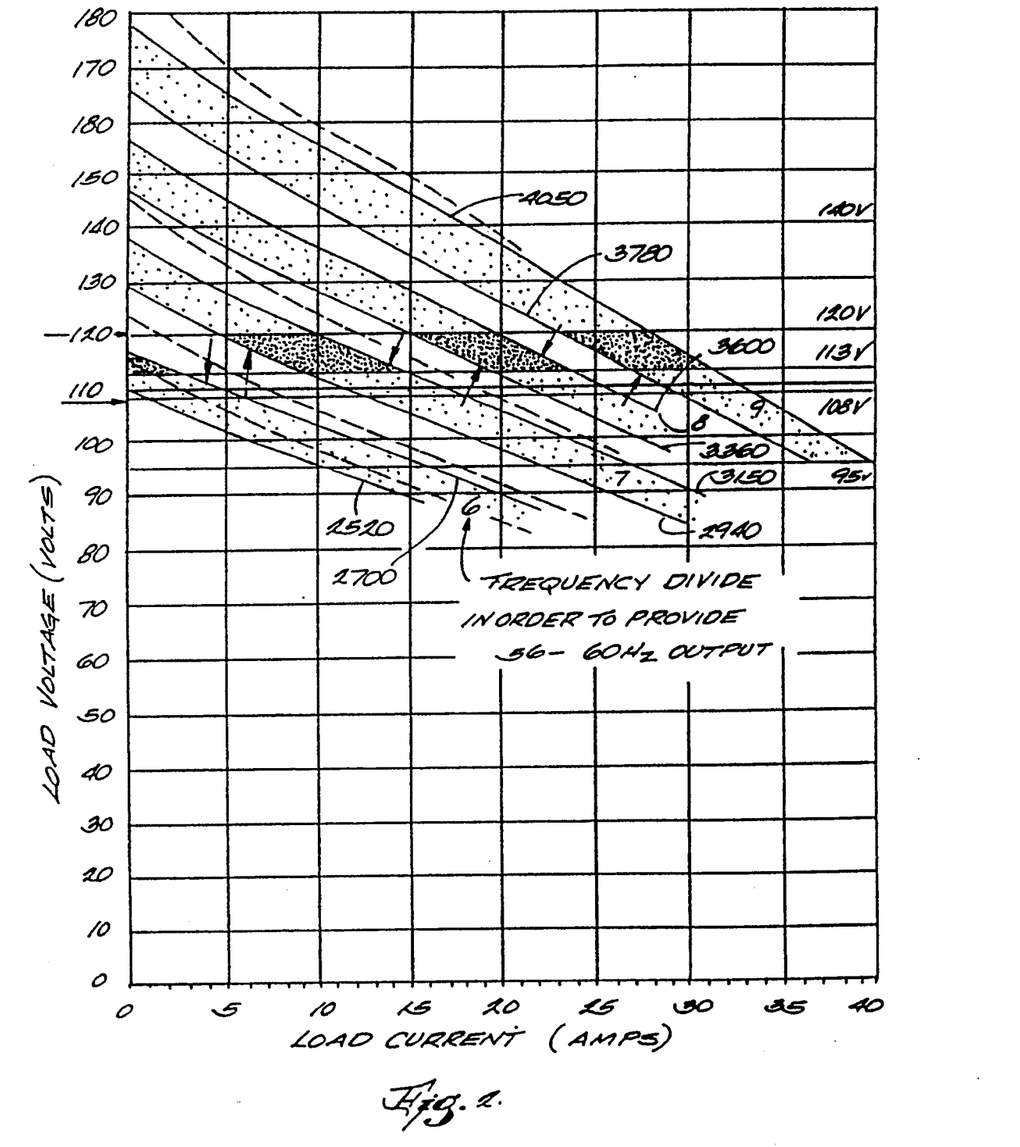
FIG. 2 is a graph showing unregulated alternator output voltage as a function of load current at various engine speeds.

The general function of the control and regulator circuit 16 can best be understood by reference to FIG. 2, which shows the relationship between the alternator output voltage versus alternator load current at various engine speeds. One characteristic of the permanent magnet alternator 14 is that the alternator output frequency and voltage are direct functions of engine speed. Another characteristic is that, at a given engine speed, the output or load voltage drops with increasing load current. For example, at an engine speed of 2520 rpm, the alternator output voltage drops from a maximum alternator output voltage of 110 $V_{rms}$ (no-load) to 90 $V_{rms}$ when the load current is 15 amperes. At an engine speed of 2700 rpm, the alternator voltage drops between 118 $V_{rms}$ (no-load) to 90 $V_{rms}$ at 20 amperes. Similar relationships are exhibited at engine speeds of 2940 rpm, 3150 rpm, 3360 rpm, 3600 rpm, 3780 rpm and 4050 rpm. In all cases, the maximum (no-load) voltage increases with increasing engine speed and the maximum load current obtainable at any given voltage also increases with increasing engine speed. Maximum output power at any given engine speed is obtained from the alternator 14 when the load current is such that the alternator output voltage drops to about 70% of its no-load value.

For the typical permanent magnet alternator 14 whose output characteristics are shown in FIG. 2, the alternator output frequency is a direct function of engine speed. In the example shown, the output frequency (in Hertz) is equal to eight times the engine speed in revolutions per second. Thus, the alternator output frequency varies from 336 Hz. at an engine speed of 2520 rpm, to 540 Hz. at an engine speed of 4050 rpm. The generator output frequency is lower than the alternator output frequency and is derived by frequency dividing the A-C alternator output by a whole number or integer divisor.

Because the A-C power requirements for most electrical devices, motors and machines call for a more or less fixed frequency and voltage, (e.g, 120 V, 60 Hz.) the alternator output is not directly usable without further voltage and frequency conversion and regulation. For example, if it is desired that the generator output voltage be kept between 108 and 120 $V_{rms}$ at any load current between 0 and 34 amperes, FIG. 2 shows that such an output can be obtained provided that the engine 12 is operated within predetermined upper and lower speed ranges that depend on the load current. For example, if the load current is 10 amperes, the desired generator output can be kept within the voltage limits by operating the engine 12 between approximately 2940 rpm and 3150 rpm. If, in addition, it is desired to maintain the output frequency between, for example, 56 Hz. and 60 Hz., (and it is further desired that the generator output frequency is obtained by frequency dividing the alternator output by a whole number integer) FIG. 2 shows that this requirement also imposes limits on the available engine operating speeds.

For example, if the generator output current is derived by frequency dividing the alternator output current by the integer 6, the requirement that the output frequency remain between 56 Hz. and 60 Hz. requires that the engine be operated between the speeds of 2520 rpm and 2700 rpm. Similarly, if the divisor is the integer 7, the engine must operate between the speeds of 2940 rpm and 3150 rpm. Still higher engine speeds can be used by using the integers 8 and 9 as divisors.

The generator output can be kept within the desired upper and lower current and frequency limits by operating the power generator 10 within the engine speed, load current and frequency divisor specifications shown in the dark shaded regions of FIG. 2. For example, the desired voltage and frequency characteristics can be obtained at load currents up to six amperes by using an engine speed up to 2700 rpm and a frequency divisor of 6. If additional current is desired, the engine speed must be increased above 2700 rpm in order to keep the load voltage above 108 $V_{rms}$. Increasing the engine speed above 2700 rpm while using a frequency divisor of 6 would, however, increase the output frequency above 60 Hz. and thus place the generator output frequency outside the desired range. However, if the frequency divisor is increased to 7, and the engine speed is increased to 2940 rpm, the desired load current can be obtained while maintaining the generator output voltage and frequency within the desired limits. Similarly, for load currents greater than approximately 17 amperes (in the example shown), it is necessary to raise the engine speed to at least 3360 rpm and to use a frequency divisor of 8. This provides the desired frequency and voltage specifications up to approximately 27 amperes. Above 27 amperes, the engine speed must be increased to at least 3780 rpm and the frequency divisor increased to 9.

By controlling the engine speed and the frequency divisor in this manner, the control and regulator circuit 16 of the power generator 10 allows a single permanent magnet alternator 14 to provide up to its maximum available power at any given engine speed while still maintaining the output voltage within tolerable limits.

Figure 3:
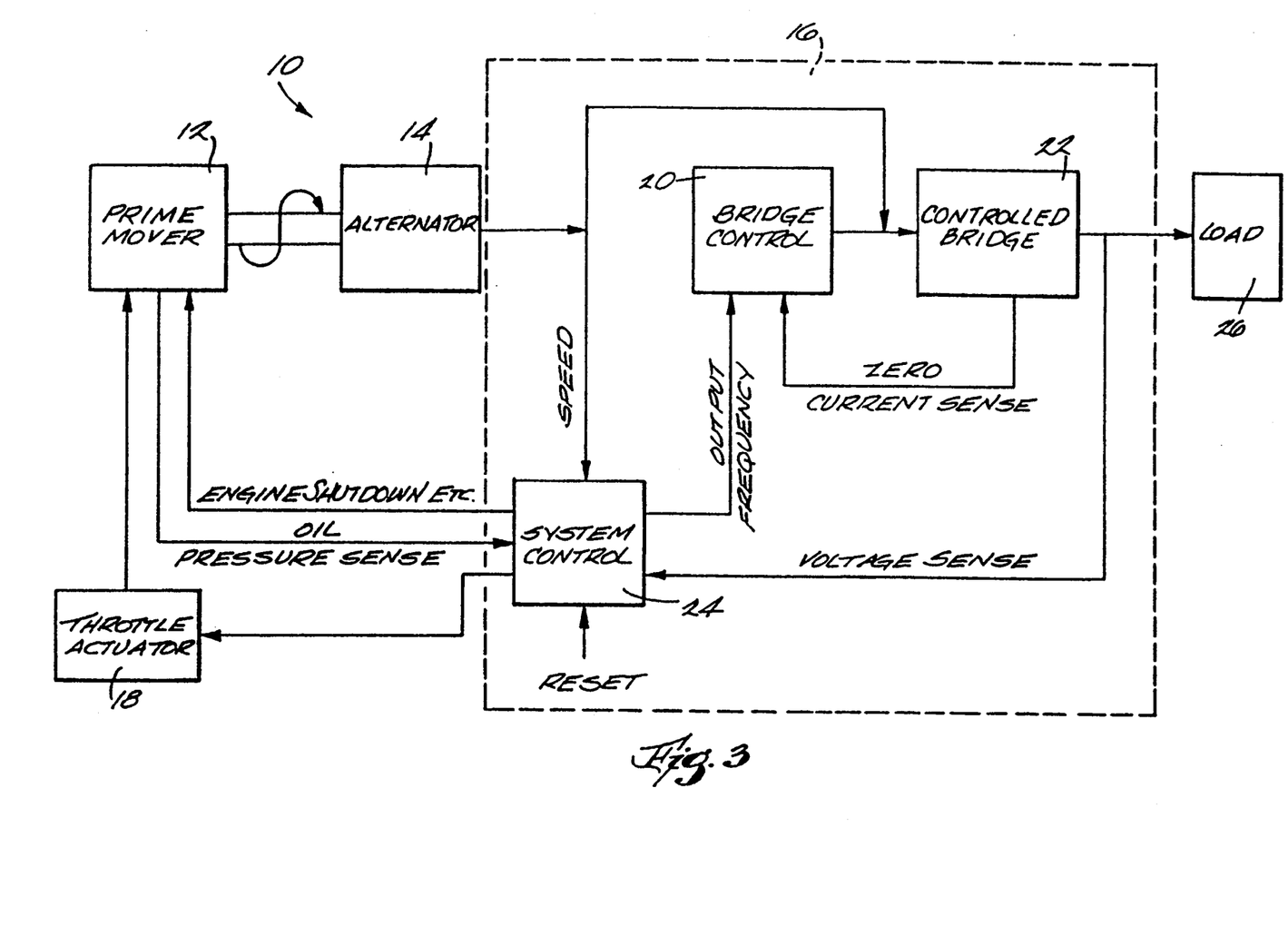
FIG. 3 is a simplified functional block diagram of the engine-driven generator constructed in accordance with various aspects of the invention.

A system for implementing the scheme described above is shown in FIGS. 3 and 4. As illustrated in FIG. 3, the generator 10 includes, in addition to the internal combustion engine (prime mover) 12 and alternator 14, a throttle actuator 18, a bridge control 20, a controlled bridge 22 and a system control circuit 24. The throttle actuator 18, which is preferably one such as that shown and described in the aforementioned application of Kern, et al. entitled "Internal Combustion Engine for Portable Power Generating Equipment," is coupled to the internal combustion engine 12 and increases or decreases the engine speed in accordance with electronic control instructions received from the system control 24. The system control 24 also receives inputs indicative of the engine operating conditions and provides additional control commands (e.g., an engine shutdown command in the event oil pressure is lost) to the engine 12.

The output of the alternator 14 is applied to the controlled bridge 22 which, in known manner, full-wave rectifies the alternator output current to develop a continuous series of unidirectional pulses wherein each of the pulses comprises substantially one half-cycle of the alternator output current. The direction of the unidirectional pulses can be controllably reversed to provide either positive going or negative going pulses at the output of the controlled bridge. These pulses are available for application to a load 26.

The polarity of the unidirectional pulses provided at the output of the controlled bridge 22 is controlled by the bridge control 20 which, in turn, is controlled by the system control 24. Fundamentally, the bridge control 20, under the direction of the system control 24, periodically reverses the direction of the pulses from the controlled bridge 22 so that the output of the controlled bridge 22 consists of alternating sequences of positive and negative going pulses. The transition from positive going pulses to negative going pulses and back again takes place at a cyclical rate substantially equal to the desired output frequency of the generator 10 (e.g., 56-60 Hz.)

The system control 24 monitors the frequency of the alternator output (which is also indicative of engine speed) as well as the output voltage of the controlled bridge 22. In this manner, the system control 24 simultaneously monitors the output frequency and output (load) voltage provided by the generator 10.

Figure 4:
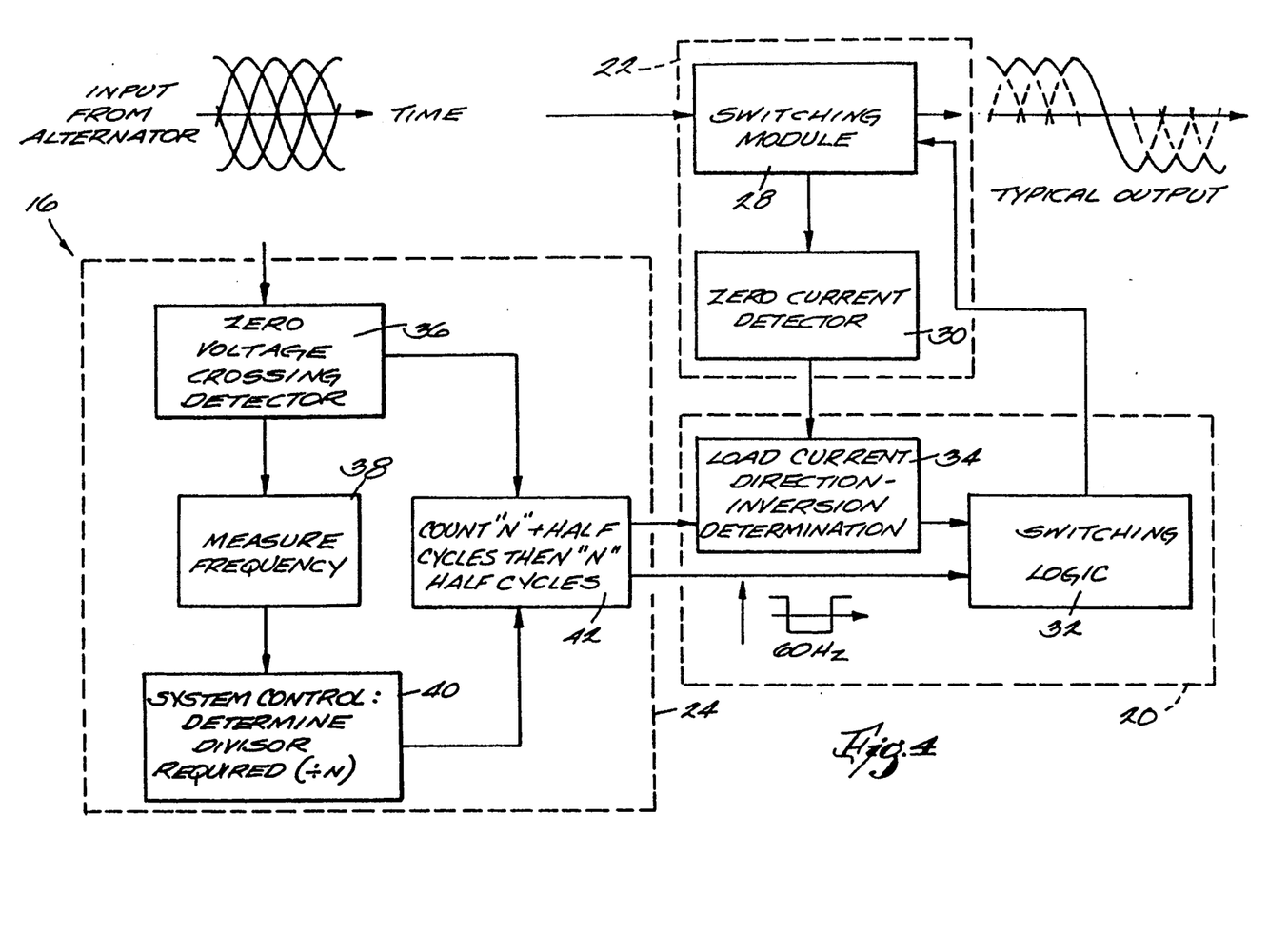
FIG. 4 is a functional block diagram of an AC to AC converter incorporated in the engine-driven generator embodying various features of the invention.

The control and regulator circuit 16 is shown in greater detail in the system block diagram of FIG. 4. As illustrated, the controlled bridge 22 includes a triac switching module 28 that performs the full-wave rectifying function. The input to the triac switching module 28 consists of the output of the alternator 14 (FIG. 3), which, in practice, can be a one, two or three phase alternating current. The triac switching module 28 includes a plurality of triacs that can be controllably switched to provide, at their outputs, either positive or negative going unidirectional pulses. The controlled bridge 22 further includes a zero current detector 30 that detects when the zero current or "cross over" point occurs as the direction of the output current is reversed.

The bridge control 20 includes triac switching logic 32 for controlling which of the individual triacs are actuated as necessary to achieve the desired current output. The bridge control 20 further includes a load current direction determination circuit 34 that responds to the zero current points detected by the zero current detector 30 to determine whether the load voltage and current have opposite polarity and whether triac inversion is required.

The system control 24 includes a zero voltage crossing detector 36 that detects the zero voltage cross-over points of the alternator output potential. This enables the system control 24 to count the individual half cycles of the alternator potential. The system control 24 further includes frequency measuring logic 38 that measures the period of these cross over points.

After measuring the frequency of the alternator voltage, the system control 24 next calculates (40) by what integer the alternator output frequency must be divided in order to produce an alternating current within the desired frequency range, e.g., 56-60 Hz. The number or divisor N thus calculated is loaded into a counter circuit 42 that, in response to the signal developed by the zero voltage crossing detector 36, counts the requisite number N of half cycles of the alternator output current. Upon reaching the required count, the counter 42 then signals the triac switching logic 32 of the bridge control 20 to reverse the voltage provided at the output of the controlled bridge 22. Additionally, the counter 42 signals the load current direction/inversion determination circuit 34 which signals the triac switching logic 32 to cause triac inversion.

Figure 5A:
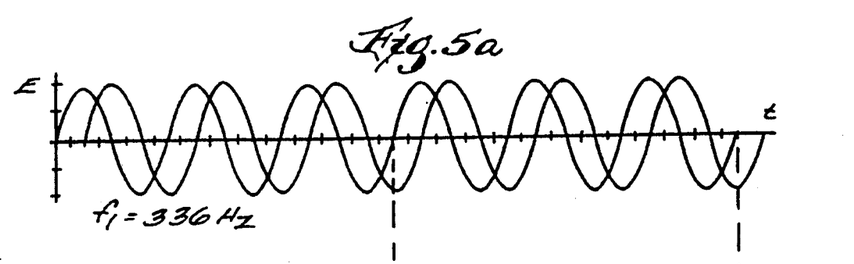
FIGS. 5A–5E are graphs showing various waveforms useful in understanding the method for providing frequency regulation in the engine-driven generator.
Figure 5B:
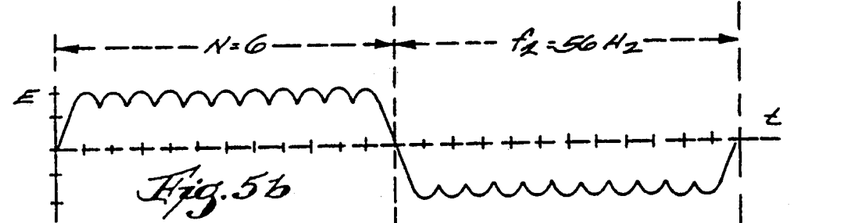

The operation of the system can best be understood by reference to the waveform diagram of FIGS. 5(a)-5(e). In FIG. 5, an alternator 10 providing a two phase output is utilized. The alternator output voltage is illustrated in FIG. 5(a). The output of the controlled bridge 22 is shown in FIG. 5(b). As shown, the output of the controlled bridge 22 consists of a predetermined number of positive-polarity half-cycles of the alternator voltage, followed by an equal number of negative-polarity half-cycles of the alternator voltage. This sequence is repeated over and over, and the repetition rate constitutes the output frequency of the generator.

In the example illustrated in FIGS. 5(a) and 5(b) the engine 12 is operating at 2520 rpm thereby giving the alternator output a frequency of 336 Hz. The system control 24 specifies a divisor of N=6 which places the output frequency of the generator 10 at 56 Hz. As shown in FIG. 5(b) each half-cycle of the generator output includes six half-cycles of the alternator output.

Figure 5C:
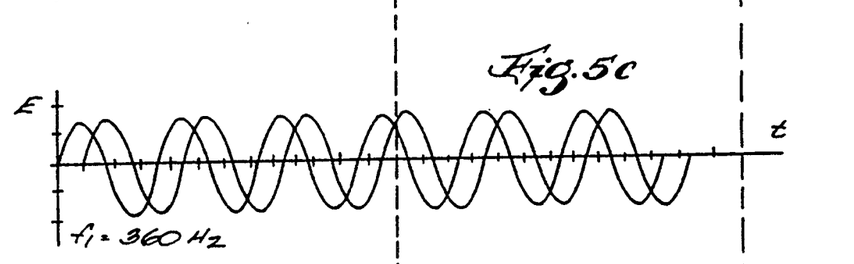
Figure 5D:
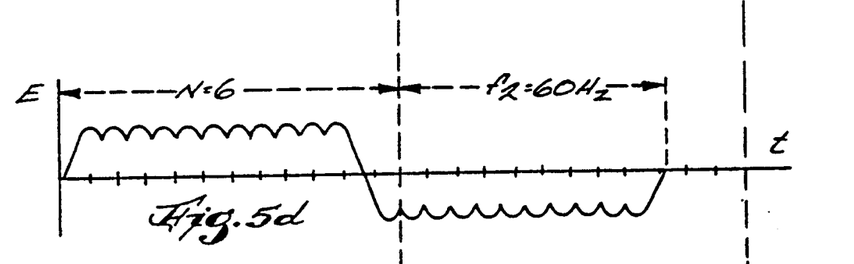

In FIGS. 5(c) and 5(d) the engine speed has increased to 2700 rpm thereby placing the alternator output frequency at 360 Hz. The divisor N remains at 6 and the same number of alternator output half-cycles remain in each half-cycle of the generator output. However, because of the reduced period (increased frequency) of the alternator output, the generator output frequency has now increased to 60 Hz.

Figure 5E:
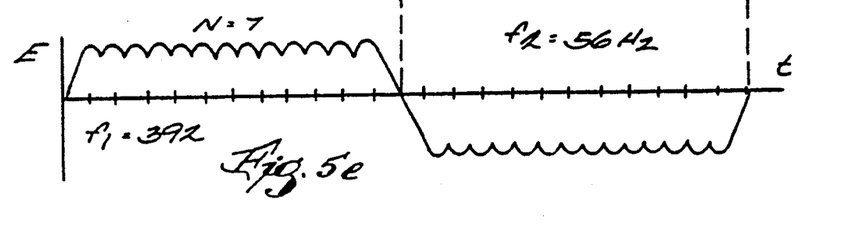

In FIG. 5(e) the engine speed is now 2940 rpm and the alternator output frequency in 392 Hz. If the divisor remained at N=6, the generator output frequency would be 65.3 Hz., which is outside of the predetermined frequency range. Accordingly, the system control 24 selects 7 as the divisor N which places seven half-cycles of alternator output in each half-cycle of generator output thereby giving a generator output frequency of 56 Hz. A divisor of N=7 is useful up until the engine speed reaches 3150 rpm at which point the alternator frequency is 420 Hz. and the generator output frequency is 60 Hz. Above 3150 rpm, a divisor of N=7 cannot be used as this would place the generator output frequency above 60 Hz.

It should be noted that, when the next divisor (i.e., N=8) is selected, the minimum permissible engine speed is 3360 rpm (alternator frequency of 448 Hz.) as any lower engine speed would then place the generator frequency below the low frequency limit of 56 Hz. Accordingly, in the particular embodiment shown and described, certain engine speed ranges, i.e., 2700–2940 rpm, 3150–3360 rpm and 3600–3780 rpm, are unavailable regardless of the 10ad current and regardless of the particular divisor in use at any time.

Due to the rotational inertia of the internal combustion engine 12 and the alternator 14, it is not possible to change, instantaneously, the engine speed to match instantaneous changes in the load current. To minimize the possibility of potentially damaging overvoltage conditions that might result when the engine 12 is operating at a high speed and a heavy current load powered by the generator 10 is switched off, means are included for providing a substantially constant RMS voltage at the generator output. In the illustrated embodiment, such protection is provided by eliminating selected ones of the alternator current half-cycles from the generator output current when the alternator output voltage rises above predetermined limits. This function is illustrated in FIGS. 6(a) through 6(c).

Figure 6A:
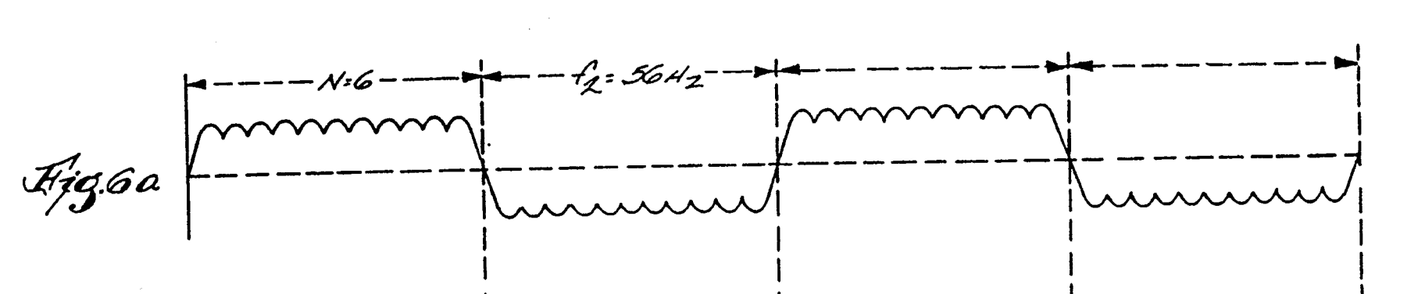
FIGS. 6A–6C are graphs showing various waveforms useful in understanding the method for providing over voltage protection in the engine-driven generator.

In FIG. 6(a), the alternator voltage is within acceptable limits and each of the half-cycles determined by the divisor N are included in the generator output.

Figure 6B:
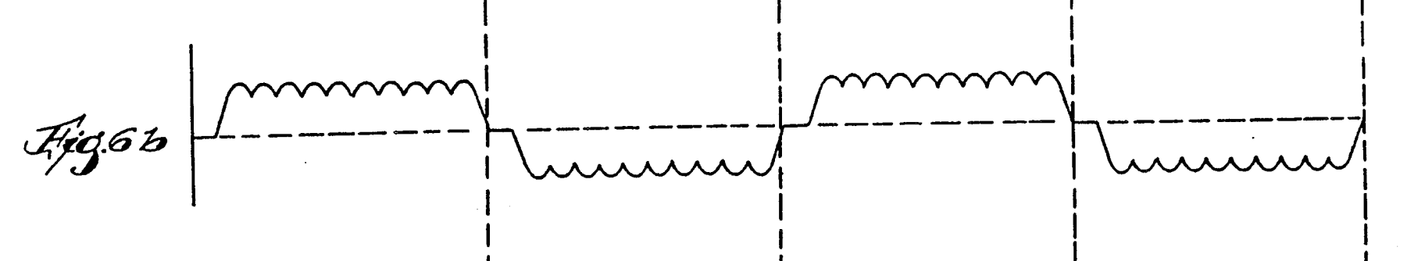

In FIG. 6(b) the alternator output voltage has increased to the point that the generator output RMS voltage would exceed the upper voltage limit. To prevent this, the system eliminates one pulse from the positive and negative going half-cycles of the generator output. The period (and hence the frequency) of the generator output, however, remains unchanged. In this manner, the generator output frequency remains fixed while the RMS output voltage of the generator 10 is rapidly reduced.

Figure 6C:
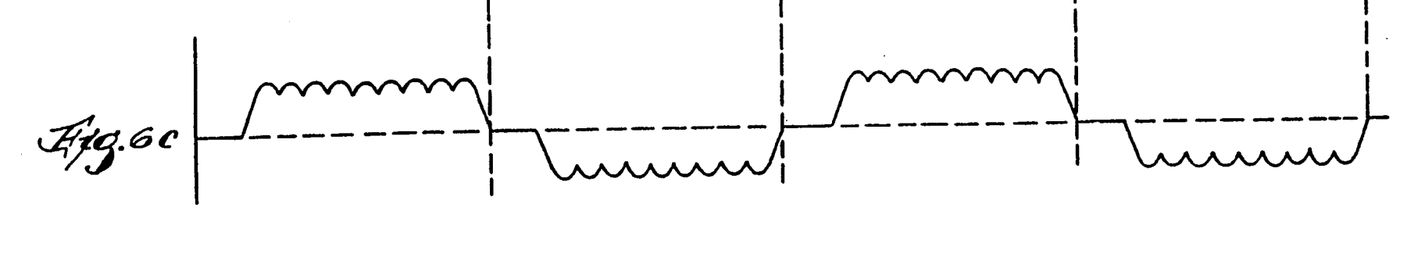

In FIG. 6(c) the alternator output voltage has risen to a point that it is necessary to delete two pulses from the generator output to maintain the RMS generator output voltage within limits. Once again, the output frequency of the generator 10 is unchanged.

The deletion of certain cycles of the alternator output from the generator output can be implemented through suitable control of the triacs in the controlled bridge 22.

It is important to note that the above-described voltage regulation is intended to function as a substantially instantaneous voltage control to prevent overvoltage conditions while the engine speed is being reduced. It will be appreciated that gross voltage regulation is provided by controlling the engine speed and that, after the engine speed has been sufficiently reduced, it is no longer necessary to eliminate selected cycles of the alternator output from the generator output. Alternatively, a phase-back technique can be used.

The overall operation of one representative example of an engine-driven generator 10 constructed in accordance with the invention is shown in FIG. 7. This generator 10 is intended to provide up to 3.5 kilowatts while maintaining an RMS output voltage between 108 and 120 volts and an output frequency between 56 and 60 Hz. Such a generator incorporates a sixteen pole, two phase permanent magnet alternator 14 that provides eight cycles of alternating current in each phase per revolution of the alternator rotor.

At load currents below eight amperes, the engine operates at 2520 rpm and the divisor N is 6. With an engine speed of 2520 rpm, the output frequency is 56 Hz. As the output current rises, the engine speed increases to 2700 rpm while the frequency increases from 56 Hz. to 60 Hz. The load voltage varies from a high of 120 volts (no-load) to a low of 108 volts when the load current reaches eight amperes.

At load currents between eight and ten amperes, the divisor N is increased to 7 and the engine speed is increased to 2940 rpm which places the output frequency at 56 Hz. Between eight and ten amperes, the divisor N remains at 7 and the engine speed and the output frequency remain constant.

Between ten and fourteen amperes, the engine speed increases between 2940 rpm and 3150 rpm with increasing load current. This, of course, simultaneously increases the output frequency from 56 Hz. to 60 Hz. By so increasing the engine speed, the load voltage can be maintained within a preferred range of between 113 volts and 120 volts without approaching the low voltage limit of 108 volts. Once the engine speed reaches 3150 rpm, however, any further increase would place the output frequency above 60 Hz. Accordingly, with load currents between fourteen and sixteen amperes, the engine speed is maintained constant at 3150 rpm and the output voltage decreases with decreasing load current until the output voltage reaches 108 volts.

Once the load current reaches sixteen amperes, the divisor (N) is incremented to N=8 and the engine speed is increased to 3360 rpm, giving an output frequency of 56 Hz. This engine speed is maintained until the load current reaches twenty amperes at which time the engine speed is increased as was the case between load currents of ten and fourteen amperes. Above approximately twenty-two amperes, the engine speed is maintained at 3600 rpm (output frequency of 60 Hz.) until the load voltage drops to 108 volts at approximately twenty four amperes.

Above twenty four amperes, the divisor N is increased to N=9 and engine speed varies between 3780 rpm and 4050 rpm.

During large changes in load current, the engine speed can vary over a wide range. At the same time, it is possible for the output frequency to fall outside the preferred range. It will be apparent to those skilled in the art that, by appropriately timing the change in the divisor N it is possible (and preferred) to keep the output frequency at or below 60 Hz.

The control circuitry 16 of the engine-driven generator is preferably implemented by a suitably programmed, microprocessor-based system. The use of a microprocessor based control circuit provides considerable design flexibility and permits the engine driven generator to be particularly tailored for specific applications and tasks. Although specific voltages, currents, frequencies and engine operating speeds have been described for purposes of example, it will be appreciated that the system operating parameters can be selected to meet particular application and design criteria. Of course, in selecting particular engine and alternator combinations, consideration should be given to ensuring that the engine will be able to turn the alternator at all engine speeds and conditions of alternator load.

The engine-driven generator 10 herein shown and described provides numerous advantageous. Because the permanent magnet alternator 14 can be operated at up to its maximum power output point, a smaller and lighter alternator 14 can be used to achieve a given power level that in prior designs wherein the alternators had considerable unused, excess capacity. The use of a smaller alternator 14 reduces the physical size and weight of the generator 10 and significantly reduces manufacturing costs. Furthermore, because it is no longer necessary to operate the internal combustion engine 12 at a constant fixed speed, greater fuel economy is realized and less noise is produced while the generator is in operation and use. Finally, engine life is increased by reason of the slower operating speeds at smaller loads While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. An engine-driven generator comprising:
an internal combustion engine;
an alternator coupled to said engine and operable to develop a first alternating potential having a frequency and no-load voltage dependent on the speed of said engine;
means for converting said first alternating potential into a second alternating potential wherein said second alternating potential is of a lower frequency than said first alternating potential and wherein said second alternating potential comprises an integral number of positive polarity half-cycles of said first alternating potential followed by an equal integral number of negative polarity half-cycles of said first alternating potential; and
means for increasing or decreasing said integral number in accordance with the frequency of said first alternating potential so as to maintain the frequency of said second alternating potential between pre-established upper and lower frequency limits.

2. An engine-driven generator as defined in claim 1 further comprising speed control means for changing the speed of said internal combustion engine so as to maintain the RMS voltage of said second alternating potential above a pre-established lower voltage limit.

3. An engine-driven generator as defined in claim 2 wherein said speed control means functions to increase engine speed when the RMS voltage of said second alternating potential would not otherwise exceed said pre-established lower voltage limit and said integral number cannot be incremented without the frequency of said second alternating potential falling below said lower frequency limit.

4. An engine-driven generator as defined in claim 1 further comprising means for deleting from said second alternating potential selected ones of said positive and negative polarity half-cycles of said first alternating current so as to maintain the RMS voltage of said second alternating potential between pre-established upper and lower voltage limits.

5. A method of operating an engine-driven generator so as to generate an alternating potential having a frequency and voltage that remain within predetermined limits despite varying loads, said methods comprising the steps of;
turning an alternator with an engine to develop a first alternating potential having a frequency and no-load voltage related directly to the engine speed;
converting said first alternating potential into a second alternating potential of lower frequency than said first alternating potential wherein each positive polarity half-cycle of said second alternating potential consists essentially of an integral number of positive polarity half-cycles of said first alternating potential, and wherein each negative polarity half-cycle of said second alternating potential consists essentially of an equal number of negative polarity half-cycles of said first alternating current; and
increasing said integral number with increasing frequency of said second alternating potential so that the frequency of said first alternating potential remains within predetermined upper and lower frequency limits.

6. A method as defined in claim 5 further comprising the step of varying the engine speed so as to maintain the RMS voltage of said second alternating potential between said predetermined upper and lower voltage limits.

7. A method as defined in claim 6 wherein integral numbers of said half cycles of said first alternating potential are eliminated so as to maintain the RMS voltage of said second alternating potential substantially between said predetermined upper and lower voltage limits.

8. A method as defined in claim 7 further comprising the step of converting said first alternating potential into a series of unipolar pulses.

9. A method as defined in claim 8 further comprising the step of periodically reversing the polarity of said unipolar pulses at a cyclical rate determined by the desired frequency of said second alternating potential.

10. A method as defined in claim 9 wherein said cyclical rate is independent of the number of said positive and negative polarity half cycles included in said positive and negative polarity half cycles of said second alternating potential.

11. A method as defined in claim 5 further comprising the step of eliminating selected ones of said positive and negative polarity half cycles of said first alternating potential from said positive and negative polarity half cycles of said second alternating potential so that the RMS voltage of said second alternating potential remains substantially between predetermined upper and lower voltage limits.

12. An engine-driven generator comprising:
an internal combustion engine;
an alternator coupled to said engine and operable to develop a first alternating potential having a frequency and no-load voltage dependent on the speed of said engine;
means for converting said first alternating potential into a second alternating potential wherein said second alternating potential is of a lower frequency than said first alternating potential and wherein said second alternating potential comprises a predetermined number of positive polarity half-cycles of said first alternating potential followed by an equal number of negative polarity half-cycles of said first alternating potential;
means for increasing or decreasing said predetermined number in accordance with the frequency of said first alternating potential so as to maintain the frequency of said second alternating potential between pre-established upper and lower frequency limits; and
means for deleting from said second alternating current selected ones of said positive and negative polarity half-cycles of said first alternating current so as to maintain the RMS voltage of said second alternating current between pre-established upper and lower voltage limits.

13. A method of operating an engine-driven generator so as to generate an alternating potential having a frequency and voltage that remain within predetermined limits despite varying loads, said method comprising the steps of:
turning an alternator with an engine to develop a first alternating potential having a frequency and no-load voltage related directly to the engine speed;
converting said first alternating potential into a second alternating potential of lower frequency than said first alternating potential wherein each positive polarity half-cycle of said alternating potential comprises a predetermined number of positive polarity half-cycles of said first alternating potential, and wherein each negative polarity half-cycle of said second alternating potential comprises an equal number of negative polarity half-cycles of said first alternating current;
increasing said predetermined number with increasing frequency of said second alternating potential so that the frequency of said first alternating potential remains within predetermined upper and lower frequency limits; and
varying the engine speed so as to maintain an integral number of said half-cycles of said first alternating potential in each of said half-cycles of said second alternating potential and to maintain the RMS voltage of said second alternating potential between said predetermined upper and lower voltage limits.

14. An engine-driven generator comprising:
an internal combustion engine;
an alternator coupled to said engine, said alternator developing an alternator current having a frequency and no-load voltage dependent on the speed of said engine;
a controlled bridge coupled to said alternator operable to convert said alternator current to a series of pulses of selectable polarity, each of said pulses comprising substantially one half-cycle of said alternator current; and
a system control coupled to said controlled bridge operable to control the polarity of said pulses and thereby arrange said pulses into alternating sequences of opposite polarity, each of said sequences containing substantially exactly an integral number of said pulses;
said system control being further operable to vary said integral number so as to maintain the cyclical alternating rate of said alternating sequences substantially between pre-established upper and lower frequency limits.

* * * * *